May 2, 1944.  E. N. JACOBI  2,348,134
COINCIDENTAL IGNITION AND GEAR SHIFT LOCK
Filed Aug. 4, 1941  2 Sheets-Sheet 1
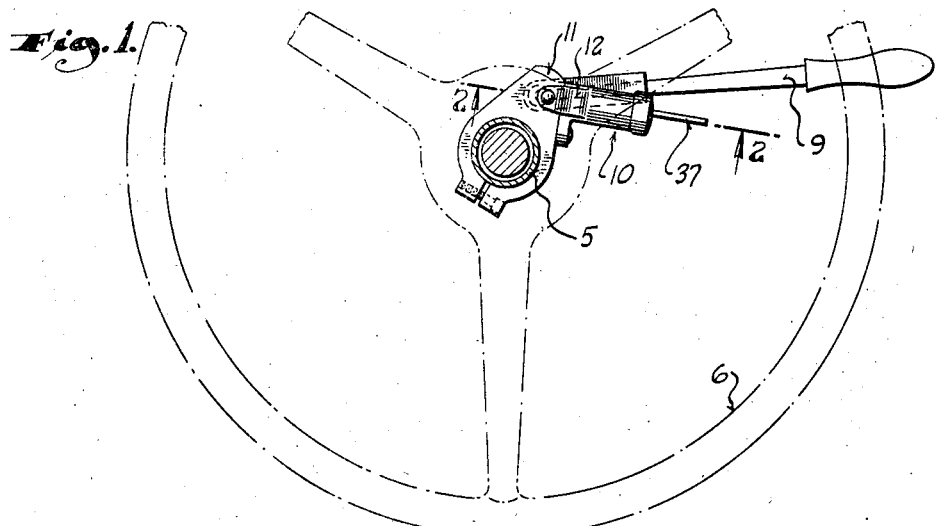
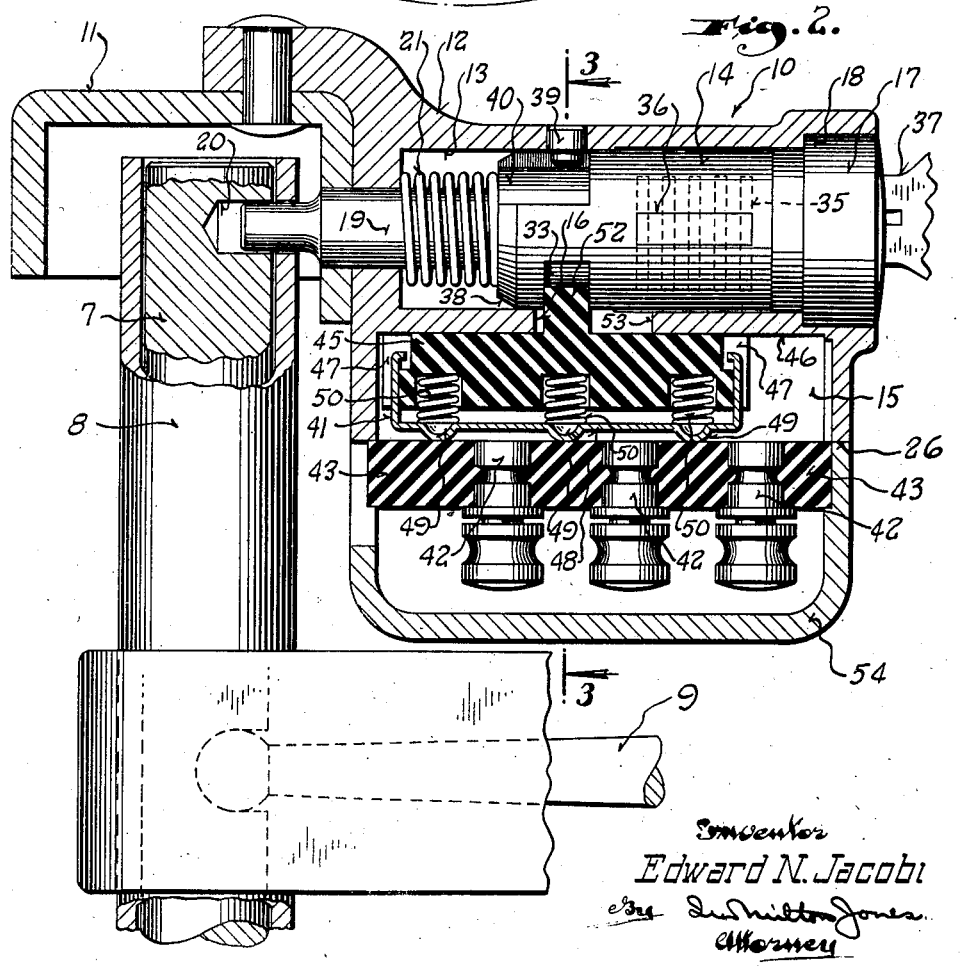
Inventor
Edward N. Jacobi

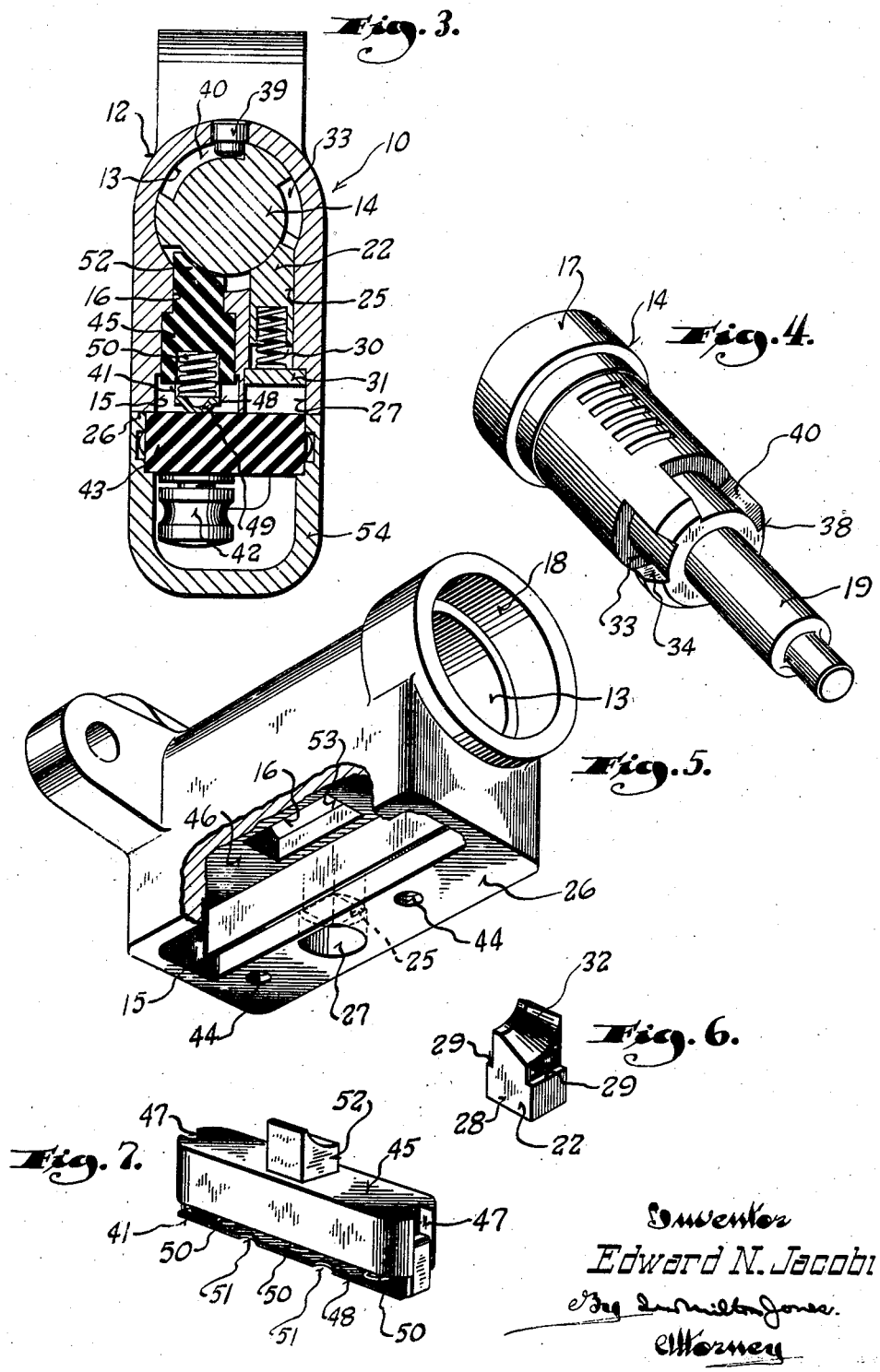

Patented May 2, 1944

2,348,134

UNITED STATES PATENT OFFICE 2,348,134

COINCIDENTAL IGNITION AND GEARSHIFT LOCK

Edward N. Jacobi, Milwaukee, Wis., assignor to Briggs & Stratton Corporation, Milwaukee, Wis., a corporation of Delaware Application August 4, 1941, Serial No. 405,311

11 Claims. (Cl. 200—44)

This invention relates to improvements in coincidental locks and refers particularly to a coincidental ignition switch and gear shift lock.

The primary objective of this invention is to provide a coincidental lock of this type adapted for use with the modern steering gear mounted shifter mechanism. In this type of gear shifting control, a shifter rod extends alongside the steering column to be actuated by a shifter lever directly under the steering wheel.

In keeping with its primary objective, it is an object of this invention to provide a lock device capable of being mounted on the steering column under the steering wheel in position to engage and secure the shifter rod against actuation simultaneously with the securement of the ignition switch in its switch-open position.

More specifically, it is an object of this invention to provide a lock device wherein a lock cylinder slidably and rotatably mounted in a supporting structure is manually projectible to a locking position engaging a part thereof with the shifter rod to lock the same and securing the contactor of the ignition switch in its switch-open position.

Another object of this invention is to provide a novel manner of drivingly connecting the switch contactor with the lock cylinder and for utilizing the means for defining the switch-closed position of the contactor as the means for limiting outward projection of the cylinder.

Another object of this invention resides in the provision of a novel spring detent arrangement for holding the cylinder in its locked position which is so designed that rotation of the cylinder to a predetermined position is required for its release and wherein engagement to hold the cylinder in its locked position takes place automatically upon inward depression of the cylinder.

Still another object of this invention is to provide a novel and exceedingly simple manner of assuring firm contact between the contactor and the stationary contacts of the switch.

A further object of this invention is to provide a lock device for the purpose described which is simple in design and construction so as to be readily susceptible to production methods of manufacture.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Figure 1 is a top view of a lock device constructed in accordance with this invention and illustrating its application to a shifter mechanism of the type for which the invention is designed;

Figure 2 is an enlarged detail sectional view taken through Figure 1 on the plane of the line 2—2;

Figure 3 is a cross sectional view taken through Figure 2 on the plane of the line 3—3;

Figure 4 is a perspective view of the lock cylinder per se;

Figure 5 is a perspective view of the lock body or supporting structure per se;

Figure 6 is a detail perspective view of the spring plunger which retains the cylinder in its locked position; and Figure 7 is a detail perspective view of the contactor assembly.

Referring now particularly to the accompanying drawings in which like numerals designate like parts, the numeral 5 designates the steering column of an automobile which as is customary mounts the usual steering wheel 6 at its upper end. Positioned alongside the steering column is a movable gear shifter rod 7 enclosed within a tube 8.

The tube 8 is suitably supported from the steering column in any manner and the rod extends down along the column to connect with the gear shifting mechanism within the transmission (not shown). Gear shifting motions are imparted to the rod by means of a lever 9 mounted under the steering wheel.

Adjacent to the upper end of the gear shifter rod 7 is the lock mechanism of this invention indicated generally by the numeral 10. This lock mechanism is carried by a bracket 11 clamped to the steering column and to which the lock body or supporting housing 12 is riveted or otherwise secured.

The lock body is preferably a die casting and has a bore 13 for the reception of a lock cylinder 14 and an elongated cavity 15 in its underside. The cavity 15 extends substantially for the entire length of the bore 13 and is spaced therefrom by the wall of the bore. A rectangular hole 16 through this wall affords communication between the bore and the cavity.

The lock cylinder 14 is both slidable and rotatable in the bore 13. In its innermost position of endwise movement which is defined by the engagement of its head 17 with the bottom of a counterbore 18, a stem 19 projecting from the inner end of the cylinder extends through aligned openings in the bottom of the bore, the supporting bracket 11 and the tube 8 to engage in a socket 20 in the rod 7. In this manner the rod is secured against motion and the gear shifting mechanism is locked.

A spring 21 confined between the bottom of the bore 13 and inner end of the cylinder yieldingly urges the cylinder outwardly of the bore. This tendency to project the cylinder out of the bore is opposed by a spring pressed plunger 22 slidable in a square hole 25 in the lock body. This hole is disposed to one side of the median plane of the lock body and opens to the bore and to the bottom face 26 of the lock body. Its outer end is enlarged as at 27 and has a partially circular shape.

The plunger has a square cross section to fit the square hole 25 and has a head 28 providing ledges or shoulders 29 to engage with complementary shoulders (not shown) in the square hole 25 and limit inward motion of the plunger effected by a coil spring 30. The spring 30 is seated in a well in the bottom of the plunger and bears against a spring seat 31 driven into the bottom of the partially circular lower end 27 of the plunger hole.

The upper end of the plunger, as best shown in Figure 6, is curved to fit the side of the cylinder and is bevelled or cut off at an angle as at 32 to provide a cam surface for a purpose to be hereinafter described.

This upper end of the plunger engages in a bayonet slot 33 in the inner end portion of the cylinder to hold the cylinder against outward projection by its spring 21 as long as the cylinder is in a position of rotation at which the mouth 34 of the bayonet slot is disaligned with the plunger.

Upon rotation of the cylinder to a position at which the mouth 34 aligns with the plunger, the cylinder is, of course, free to be projected outwardly by its spring 21.

The position of rotation of the cylinder in its bore is controlled by the usual key-operated tumblers 35 which in the lock illustrated, control a side bar 36 projectible from the side of the cylinder into the usual longitudinal groove (not shown) in the wall of the bore.

Inasmuch as there is but one such longitudinal groove, the key 37 can be inserted and withdrawn in only one position of cylinder rotation, this being the position shown in Figure 2 at which the mouth 34 of the bayonet slot is disaligned from the plunger 22. Hence, if it is desired to remove the key in the unlocked projected position of the cylinder, it is necessary to turn the cylinder to the position shown in Figure 2 whereupon the mouth of the bayonet slot becomes disaligned with the plunger. In this position of rotation, however, the cylinder may be readily pushed in or depressed as a push button, as the cam on the end of the plunger cooperating with the chamfered end 38 of the cylinder, cams the plunger down and allows the end of the cylinder to ride over it. The plunger then snaps into the bayonet slot and thereby retains the cylinder in its depressed locked position.

The limits of cylinder rotation are preferably defined by a pin 39 fixed in the wall of the bore and projecting into a segmental recess 40 in the inner end portion of the cylinder.

The cavity 15 contains the contactor assembly 41 of the ignition switch. The stationary contacts 42 with which the contactor cooperates are embedded in a base 43 of insulating material which is secured to the bottom face 26 of the lock body by screws (not shown) threaded into holes 44.

The switch base extends across substantially the entire bottom face of the lock body and thus closes the cavity 15 to confine the contactor assembly therein. The contactor assembly comprises a driver 45 in the form of an elongated block of insulating material having a smooth top face to slide on the ceiling 46 of the cavity and having stepped notches 47 in its opposite ends.

The contactor 48 per se consists of a strip of light metal having its ends bent up and hooked into the notches 47. Three contact portions 49 in a row are pressed into the contactor at locations corresponding to the spacing of the stationary contacts so that when the contactor assembly is in its switch closing position, each of the contact portions 49 will be above one of the stationary contacts. Individual coil springs 50 are provided for each of the contact portions. These springs are seated in wells or pockets in the underside of the driver directly over the contact portions, and by virtue of the flexible nature of the contactor strip, each contact portion has substantially independent springing to thus insure firm contact at all of the contacts.

While the metal strip which forms the contactor may be of sufficient flexibility to insure this independence of spring action, added assurance therefor may be provided by specifically weakening the strip between the contact portions as by notches 51 in the opposite sides thereof.

As stated, the insulated driver slides on the ceiling 46 of the cavity, and rising up from the top of the driver is a lug 52 which projects through the rectangular hole 16 to engage in the circular portion of the bayonet slot 33. In this manner, a driving connection is established between the cylinder and the contactor assembly.

Inward motion of the cylinder and the contactor assembly as noted hereinbefore is defined by the engagement of the head 17 on the cylinder with the bottom of the counterbore 18. Outward endwise motion of the cylinder and contactor assembly is defined by having some part of the contactor assembly abut a shoulder on the lock body. In this manner the switch closed position of the contactor is accurately assured.

This may be done by having the end of the driver engage the end of the cavity, but is preferably effected by having the lug 52 strike the forward end 53 of the rectangular hole 16.

The stationary contacts 42 are provided with the customary binding posts and nuts for the attachment of the ignition wires thereto, and to cover the same and enclose these connections a cover member 54 is provided. This cover member snaps over the edge of the switch base where it is retained by detents in the form of projection on the sides of the base engaging in notches in the adjacent walls of the cover.

From the foregoing description taken in connection with the accompanying drawings, it will be readily apparent that this invention provides a very desirable coincidental ignition switch and gear shift lock for use with modern gear shift mechanisms in which the shifter lever is positioned directly under the steering wheel.

What I claim as my invention is:

1. A coincidental ignition switch and gear shift lock for use on automobiles having steering gear mounted shift levers comprising: a lock body; means for mounting the lock body adjacent to a movable part of the gear shifting mechanism; a key controlled tumbler lock cylinder endwise slidable and rotatable in the lock body; a part on the cylinder projectible from the lock body into locking engagement with said movable part of the gear shifting mechanism to secure the same against motion; a movable switch contactor; a driving connection between the switch contactor and the lock cylinder whereby the contactor is driven by the cylinder upon endwise sliding motion of the cylinder; and means for defining at least one limit of motion of said contactor so as to accurately locate said position and simultaneously determine one position of endwise motion of the cylinder.

2. In a lock device of the character described: a movable member to be controlled, said member having a socket; a fixed supporting member adjacent to said member; a key controlled tumbler lock cylinder movably mounted in said supporting member and having a part projecting therefrom for engagement in the socket to secure said movable member against actuation; a spring yieldably urging the lock cylinder in a direction to withdraw its said part from the socket; a spring plunger mounted in the supporting member and yieldably urged toward the cylinder; and said cylinder having a bayonet slot to receive the end of the spring plunger to hold the cylinder in its operative locking position in one position of rotation while allowing endwise motion out of its locking position under action of its spring in another position of rotation.

3. In a lock of the character described: a lock body having a bore; a lock cylinder slidable and rotatable in the bore; a spring yieldingly urging the cylinder longitudinally toward an unlocked position; key-controlled mechanism carried by the lock cylinder for securing the cylinder against rotation, said cylinder having a bayonet slot; a spring pressed plunger carried by the lock body and yieldingly projecting into the bayonet slot to hold the cylinder against endwise motion in a locked position depressed against the action of its spring, rotation of the cylinder to a position at which the mouth of the bayonet slot aligns with the plunger releasing the cylinder for outward projection; and cam means for depressing the plunger in the event of depression of the cylinder to its locked position while in a position of rotation at which the plunger is disaligned from the mouth of the bayonet slot.

4. In a lock device of the character described: a lock body having a bore; a tumbler lock cylinder slidable and rotatable in the bore and having a part projectible from the bottom of the bore into engagement with a part to be locked when the cylinder is pushed into the bottom of the bore; a spring yieldingly urging the lock cylinder outwardly to an unlocking position; key-controlled means for securing the cylinder against rotation; a spring pressed plunger in the lock body projecting into its bore for engagement with the cylinder, said cylinder having a bayonet slot in its inner end to receive the plunger, said plunger securing the lock cylinder in its depressed position against the tension of its spring when in a predetermined position of rotation so as to require rotation of the lock cylinder to the point at which the mouth of its bayonet slot aligns with the plunger for outward spring propelled projection of the lock cylinder to an unlocking position; and cooperating cam means on the plunger and the inner end of the lock cylinder for depressing the plunger during depression of the lock cylinder while in a position of rotation at which the mouth of the bayonet slot is disaligned from the plunger so that the plunger acts with a detent action to snap into the bayonet slot and retain the lock cylinder in its depressed locking position.

5. In a lock device of the character described: a lock body having a bore and a cavity adjacent to the bore but separated therefrom by the wall of the bore, said wall having a hole therethrough to communicate the bore with said cavity; a tumbler lock cylinder slidable and rotatable in the bore; a spring yieldingly urging the lock cylinder outwardly of the bore; spring detent means for holding the cylinder depressed in the bore against the tension of its spring, said detent means being releasable upon rotation of the cylinder to a predetermined position; key-controlled means for locking the cylinder against rotation; a switch part movable in the cavity; a driving connection between said switch part and the lock cylinder passing through said opening, said connection allowing free rotation of the cylinder without imparting motion to said switch part; and means for defining at least one limit of motion of said switch part to thus accurately locate said position and simultaneously determine one position of endwise motion of the cylinder.

6. In a lock switch of the character described: a supporting body having a bore and a cavity adjacent to the bore but spaced therefrom by the wall of the bore, said wall having a hole therethrough; a switch contactor movable in the cavity between switch-open and switch-closed positions, the switch-closed position requiring accurate positioning of the contactor; a key controlled tumbler lock cylinder slidable and rotatable in the bore; a spring yieldingly urging the lock cylinder out of the bore; releasable means for holding the cylinder in the bore in a depressed position against the tension of its spring, said means being releasable to free the cylinder for outward spring propelled projection by rotation of the cylinder to a predetermined position; and a driving connection between said switch contactor and the lock cylinder passing through the hole in the wall of the bore and engaging one edge of the hole to simultaneously accurately locate the contactor in its switch closed position and limit outward spring propelled projection of the lock cylinder.

7. In a lock switch of the character described: a supporting body having a bore and a cavity adjacent to the bore but spaced therefrom by the wall of the bore, said wall having a hole through which the bore is communicated with the interior of the cavity; a switch base fixed to the supporting body and closing the mouth of the cavity; stationary contacts on the base exposed on the inner face thereof to the interior of the cavity; a contactor movable to and from a position engaging said stationary contacts; a driver for the contactor having a part projecting through said hole into the bore; cooperating abutments on said driver and the supporting body for accurately defining the switch-closed position of the driver and contactor; a tumbler lock cylinder slidable and rotatable in the bore; key-operated means for controlling the movements of the lock cylinder in the bore; and a driving connection between said part of the driver which projects into the bore and the lock cylinder so that motion of the lock cylinder is transmitted to the driver and switch contactor.

8. In a switch device of the character described: a switch base having spaced stationary contacts; a bridging contactor movable across the base to and from engagement with the contacts; an insulated driver for the contactor, said driver comprising a block of insulating material having notches in its opposite ends, the contactor comprising a thin strip of metal extending along the length of the driver and having upstanding arms with inwardly directed end portions engaging in said notches so that the contactor is loosely but drivingly connected to the driver; outwardly projecting contact portions on the contactor which ride on the base and engage the stationary contacts; and individual contact springs seated in wells in the driver over each of said projections to provide independent contact pressure for each of said contact portions.

9. In a lock switch of the character described: a tumbler lock cylinder mounted for rotary and longitudinal movement; a switch adjacent to the lock cylinder having a part movable to and from a position closing the switch; and a connection between said switch part and the lock cylinder permitting rotation of the lock cylinder without imparting motion to said switch part, but whereby back and forth longitudinal motion of the lock cylinder effects movement of said switch part to and from switch closing position, said connection including a circumferential groove in the cylinder and a driver on the switch part engaged in said groove.

10. In a lock switch of the character described: a supporting body having a bore and a cavity adjacent to the bore but spaced therefrom by the wall of the bore, said wall having a hole therethrough; a switch base fixed to the supporting body inside said cavity, said base having stationary contacts thereon; a switch contactor movable in said cavity to and from a position engaging said stationary contacts; a driver for the contactor having a part extending through said hole into the bore, said driver being movable relative to the contactor toward and from the stationary contacts on the switch base; a tumbler lock cylinder rotatable and endwise slidable in said bore; a driving connection between the lock cylinder and said part of the driver which extends through said hole into the bore by which endwise motion of the lock cylinder is transmitted to the driver and switch contactor, said connection permitting rotation of the lock cylinder relative to the driver; and spring means reacting between the driver and the contactor to furnish contact pressure and to hold the driver part projected into the bore.

11. In a lock switch of the character described: a supporting body having a bore and a cavity adjacent to the bore but spaced therefrom by the wall of the bore, said wall having a hole therethrough; a switch in said cavity including stationary contacts fixed to the supporting body in insulated relationship therewith, a switch contactor disposed between said wall of the bore and the stationary contacts and movable to and from a position engaging said stationary contacts, and a driver of insulating material for the contactor having a part extending through said hole into the bore, said driver being disposed between said wall of the bore and the switch contactor and being movable relative to the contactor toward and from the stationary contacts; a tumbler lock cylinder rotatably and endwise slidable in said bore; a driving connection between the lock cylinder and said part of the driver which extends into the bore by which endwise motion of the lock cylinder is transmitted to the driver and switch contactor, said connection permitting rotation of the lock cylinder relative to the driver; and spring means disposed between the driver and the contactor to hold the driver against said wall of the bore with said part thereof projected into the bore and to furnish contact pressure between the switch contactor and the stationary contacts.

EDWARD N. JACOBI.